(12) United States Patent
Okumura et al.

(10) Patent No.: US 10,731,751 B2
(45) Date of Patent: Aug. 4, 2020

(54) AUTOMATIC GEAR CHANGER CONTROL DEVICE AND CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Kunihiko Okumura, Atsugi (JP); Takeshi Fujii, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 21 days.

(21) Appl. No.: 16/319,250

(22) PCT Filed: Jul. 19, 2017

(86) PCT No.: PCT/JP2017/026142
§ 371 (c)(1),
(2) Date: Jan. 18, 2019

(87) PCT Pub. No.: WO2018/016539
PCT Pub. Date: Jan. 25, 2018

(65) Prior Publication Data
US 2019/0264802 A1    Aug. 29, 2019

(30) Foreign Application Priority Data
Jul. 20, 2016  (JP) ................. 2016-142578

(51) Int. Cl.
*B60W 10/06* (2006.01)
*B60W 10/11* (2012.01)
(Continued)

(52) U.S. Cl.
CPC ............. *F16H 59/18* (2013.01); *F16H 59/34* (2013.01); *F16H 59/36* (2013.01); *F16H 59/48* (2013.01);
(Continued)

(58) Field of Classification Search
CPC .... B60W 10/06; B60W 10/11; B60W 10/115; B60W 30/18072; B60W 2520/105;
(Continued)

(56) References Cited

U.S. PATENT DOCUMENTS

2002/0086760 A1   7/2002  Hayabuchi et al.
2002/0151409 A1   10/2002 Hayabuchi et al.
(Continued)

FOREIGN PATENT DOCUMENTS

JP    2000-130577 A    5/2000
JP    2002-195402 A    7/2002
(Continued)

*Primary Examiner* — Edwin A Young
(74) *Attorney, Agent, or Firm* — Foley & Lardner LLP (57) ABSTRACT

A control device for an automatic transmission of a vehicle includes a shift control section including; a deceleration state judging section configured to judge whether a deceleration of the vehicle is a gentle deceleration state or a sudden deceleration state, and a downshift control section configured to command a plural stage downshift to downshift from a current shift stage of the automatic shift mechanism to a target shift stage that is lower than the current shift stage by two stages or more when the deceleration state judging section judges the sudden deceleration state.

6 Claims, 7 Drawing Sheets

(51) Int. Cl.
*F16H 59/18* (2006.01)
*F16H 59/34* (2006.01)
*F16H 59/36* (2006.01)
*F16H 59/48* (2006.01)
*F16H 61/02* (2006.01)
*F16H 61/14* (2006.01)
*F16H 61/686* (2006.01)

(52) U.S. Cl.
CPC ......... *F16H 61/02* (2013.01); *F16H 61/0213* (2013.01); *F16H 61/143* (2013.01); *F16H 61/686* (2013.01); *F16H 2059/186* (2013.01); *F16H 2061/0237* (2013.01); *F16H 2061/147* (2013.01)

(58) Field of Classification Search
CPC ...... F16H 59/34; F16H 59/48; F16H 61/0213; F16H 2059/186; F16H 2061/0237; F16H 2061/147
See application file for complete search history.

(56) References Cited

U.S. PATENT DOCUMENTS

| | | | |
|---|---|---|---|
| 2004/0014565 A1* | 1/2004 | Oshima | B60W 10/06 477/182 |
| 2010/0057311 A1* | 3/2010 | Okazaki | F16H 61/061 701/54 |
| 2010/0292048 A1* | 11/2010 | Oshima | B60W 10/06 477/109 |
| 2014/0080668 A1* | 3/2014 | Doering | F16H 61/21 477/97 |

FOREIGN PATENT DOCUMENTS

| | | |
|---|---|---|
| JP | 2002-310280 A | 10/2002 |
| JP | 2005-076782 A | 3/2005 |
| JP | 2010-078124 A | 4/2010 |

* cited by examiner

ENGAGEMENT TABLE

| SPEED NUMBER | B1 | B2 | B3 | C1 | C2 | C3 |
|---|---|---|---|---|---|---|
| 1 |  | ○ | ○ |  |  | ○ |
| 2 |  | ○ |  |  | ○ | ○ |
| 3 |  | ○ | ○ |  | ○ |  |
| 4 |  | ○ | ○ | ○ |  |  |
| 5 |  |  | ○ | ○ | ○ |  |
| 6 |  |  |  | ○ | ○ | ○ |
| 7 |  |  | ○ | ○ |  | ○ |
| 8 | ○ |  |  | ○ |  | ○ |
| 9 | ○ |  | ○ | ○ |  |  |
| Rev | ○ | ○ | ○ |  |  |  |

AUTOMATIC GEAR CHANGER CONTROL DEVICE AND CONTROL METHOD

CROSS-REFERENCE TO RELATED APPLICATIONS

This application is a National Phase of International Patent Application No. PCT/JP2017/026142 filed on Jul. 19, 2017, which claims priority to Japanese Patent Application No. 2016-142578 filed on Jul. 20, 2016. The contents of these applications are herein incorporated by reference in their entirety.

TECHNICAL FIELD

This invention relates to a control device and a control method of an automatic transmission (automatic gear changer control device and control method).

BACKGROUND ART

There is developed, as a fuel economy improvement of a vehicle, an art to perform a fuel cut when an engine speed is equal to or greater than a predetermined value in a coast traveling state in which an accelerator pedal is released. Moreover, a torque converter is locked-up during the fuel cut. When a vehicle speed is decreased during this fuel cut, the engine speed is decreased. When the engine speed is decreased to be a fuel recovery rotation speed, a fuel supply recovery (fuel recovery) is performed. At this fuel recovery, the lockup of the torque converter is previously released.

However, it is preferable to extend (prolong) the fuel cut period as long as possible, for improving the fuel economy.

Accordingly, there is developed an art to extend (prolong) the fuel cut period by downshifting the automatic transmission in accordance with the decrease of the vehicle speed to suppress the decrease of the engine speed to the fuel recovery rotation speed, as described in a patent document 1 (paragraph 0036 and so on) and so on.

Incidentally, a shift stage of the automatic transmission is preferred to be downshifted one after another in accordance with the decrease of the vehicle speed, for extending (prolonging) the fuel cut period as long as possible.

Figure 9:
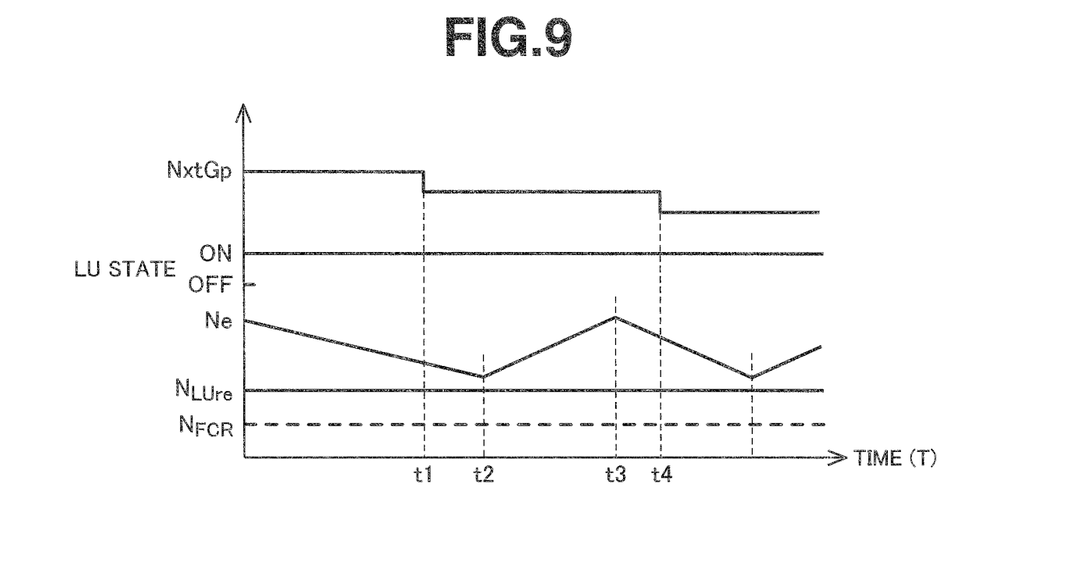
FIG. 9 is a time chart for explaining problems of the present invention.

For example, FIG. 9 is a time chart showing one example of a downshift control for extending (prolonging) the fuel cut period as long as possible. In the drawing, NxtGp represents the shift stage. Ne is the engine speed. $N_{LUre}$ is a lockup release rotation speed. When the engine speed Ne is decreased to be this rotation speed $N_{LUre}$, the lockup of the torque converter is released. $N_{FCR}$ is the fuel recovery rotation speed. When the engine speed Ne is decreased to be this rotation speed FCR after the release of the lockup, the fuel recovery is performed.

As shown in FIG. 9, when the engine speed Ne is decreased to approach the lockup release rotation speed $N_{LUre}$ due to the decrease of the vehicle speed (time t1), the downshift is performed. The engine speed Ne is decreased during a time period (during a torque phase) from the command of the downshift at time t1 to time t2 at which an inertia phase of the downshift is started. Accordingly, the downshift is commanded with a margin for this decrease of the engine speed Ne.

The engine speed Ne is increased until time t3 at which the downshift is finished by the increase of the transmission gear ratio by the inertia phase of the downshift. However, the engine speed Ne is decreased thereafter in accordance with the decrease of the vehicle speed. When the engine speed Ne is decreased to approach the lockup release rotation speed $N_{LUre}$ again (time t4), the downshift is performed.

In this way, by the sequential downshift according to the decrease of the vehicle speed, it is possible to extend (prolong) the fuel cut period while maintaining the lockup, and to improve the fuel economy.

However, for example, in a case where a strong brake force is added during the coast traveling of the vehicle, the downshift operation cannot follow the decrease of the vehicle speed.

That is, in case of the large deceleration of the vehicle, a decrease amount of the engine speed according to the decrease of the vehicle speed during the time period during which the downshift is performed becomes greater than the increase amount by the recovery of the engine speed by the downshift. Accordingly, the engine speed is decreased to be equal to or smaller than the lockup release rotation speed $N_{LUre}$ during the next downshift, so that the lockup and the fuel cut cannot be continued.

PRIOR ART DOCUMENT

Patent Document

Patent Document 1: Japanese Patent Application Publication No. 2005-76782

SUMMARY OF THE INVENTION

It is, therefore, an object of the present invention to provide a control device and a control method of an automatic transmission which is devised to solve the above-mentioned problems, and to extend a fuel cut period even at a sudden deceleration of a vehicle.

(1) According to the present invention, a control device for an automatic transmission of a vehicle arranged to bring a torque converter to a lockup state and to perform a fuel cut by which a fuel supply to an engine is stopped during a coast traveling in which an accelerator pedal is released, to release the lockup of the torque converter when an engine speed is decreased to a lockup release rotation speed during the fuel cut, and to perform a fuel recovery to finish the fuel cut to restart of the fuel supply to the engine when the engine speed is decreased to be a fuel recovery rotation speed lower than the lockup release rotation speed, the automatic transmission including the torque converter, and a stepwise automatic shift mechanism to which a rotation from the engine is input through the torque converter, and which is arranged to attain a plurality of shift stages by combinations of engagements and disengagements of a plurality of frictional engagement elements, the control device comprises: a shift control means configured to perform a downshift control of the automatic shift mechanism by a changeover of the frictional engagement elements when a vehicle speed is decreased to be equal to or smaller than a predetermined downshift vehicle speed during the fuel cut, the shift control means including; a deceleration state judging section configured to judge whether a deceleration of the vehicle is a gentle deceleration state or a sudden deceleration state, and a downshift control section configured to command one stage downshift to downshift from a current shift stage of the automatic shift mechanism to a next shift stage that is lower than the current shift stage by one stage when the deceleration state judging section judges the gentle deceleration state, and to command a plural stage downshift to downshift from the current shift stage of the automatic shift mechanism to a target shift stage that is lower than the current shift stage by two stages or more when the deceleration state judging section judges the sudden deceleration state.

(2) The control device includes a deceleration sensing means configured to sense the deceleration of the vehicle; deceleration threshold values are set at the respective shift stages of the automatic shift mechanism; and the deceleration state judging section is configured to compare the sensed deceleration with the deceleration threshold values, and thereby to judge whether the deceleration is the gentle deceleration state or the sudden deceleration state.

(3) The plural stage downshift includes a continuous downshift to continuously downshift through an intermediate shift stage toward the target shift stage, and a stage skip downshift to downshift toward the target shift stage by skipping the intermediate shift stage; the shift control means includes a stage skip judging section configured to judge from the current shift stage whether or not the stage skip downshift can be performed by a single changeover by the disengagement of one of the plurality of the frictional engagement elements, and the engagement of another of the plurality of the frictional engagement elements; and when the plural stage downshift is performed, the downshift control section configured to perform the stage skip downshift when the stage skip judging section judges that the stage skip downshift can be performed, and to perform the continuous downshift when the stage skip judging section judges that the stage skip downshift cannot be performed.

(4) The shift control means is configured to judge the shift based on a shift judgement vehicle speed value according to the detected vehicle speed by using a shift map in which shift lines are set, and to judge the shift by shifting the shift judgment vehicle speed to a lower speed side when the continuous downshift is performed.

(5) The shift control means is configured to judge the shift based on a shift judgment vehicle speed value according to the detected vehicle speed by using a shift map in which shift lines are set, and to judge the shift by using the shift lines for performing the one stage downshift from the current shift stage, when the stage skip downshift is performed.

(6) The downshift control section is configured to stop the continuous downshift when the deceleration is not the sudden deceleration state at a timing of an end of the downshift to the next shift stage in the continuous downshift.

(7) According to the present invention, a control method for an automatic transmission of a vehicle arranged to bring a torque converter to a lockup state and to perform a fuel cut by which a fuel supply to an engine is stopped during a coast traveling in which an accelerator pedal is released, to release the lockup of the torque converter when an engine speed is decreased to a lockup release rotation speed during the fuel cut, and to perform a fuel recovery to finish the fuel cut to restart of the fuel supply to the engine when the engine speed is decreased to be a fuel recovery rotation speed lower than the lockup release rotation speed, the automatic transmission including the torque converter, and a stepwise automatic shift mechanism to which a rotation from the engine is input through the torque converter, and which is arranged to attain a plurality of shift stages by combinations of engagements and disengagements of a plurality of frictional engagement elements, the control method comprises: performing a downshift control of the automatic shift mechanism by a changeover of the frictional engagement elements when a vehicle speed is decreased to be equal to or smaller than a predetermined downshift vehicle speed during the fuel cut; a deceleration state judging section judging step of judging whether a deceleration of the vehicle is a gentle deceleration state or a sudden deceleration state; and a downshift controlling step of commanding one stage downshift to downshift from a current shift stage of the automatic shift mechanism to a next shift stage that is lower than the current shift stage by one stage when the deceleration state judging step judges the gentle deceleration state, and commanding a plural stage downshift to downshift from the current shift stage of the automatic shift mechanism to a target shift stage that is lower than the current shift stage by two stages or more when the deceleration state judging step judges the sudden deceleration state.

By the present invention, by using a plural stage downshift in which a shift stage is downshifted toward a target shift stage that is smaller than a current shift stage by two stages or more, it is possible to extend (prolong) a state where an engine speed is higher than a lockup release rotation speed during a longer time period even in a sudden deceleration of a vehicle, and thereby to extend (prolong) a fuel cut period. Accordingly, it is possible to obtain fuel improvement effects.

BRIEF DESCRIPTION OF DRAWINGS

FIG. 5A shows a situation in which a plural stage downshift is needed. FIG. 5B explains an advanced vehicle speed of a continuous downshift of the plural stage downshift.

DESCRIPTION OF EMBODIMENTS

Hereinafter, an embodiment according to the present invention is explained with reference to the drawings. Besides, the below-described embodiment is merely example. It is not intended to exclude various variations and applications of the art which are not described in the below-described embodiment. Configurations in the below-described embodiment can be varied as long as they are not deviated from the gist of the invention. Moreover, they can be selected and combined if necessary.

[1. Overall System Configuration]

Figure 1:
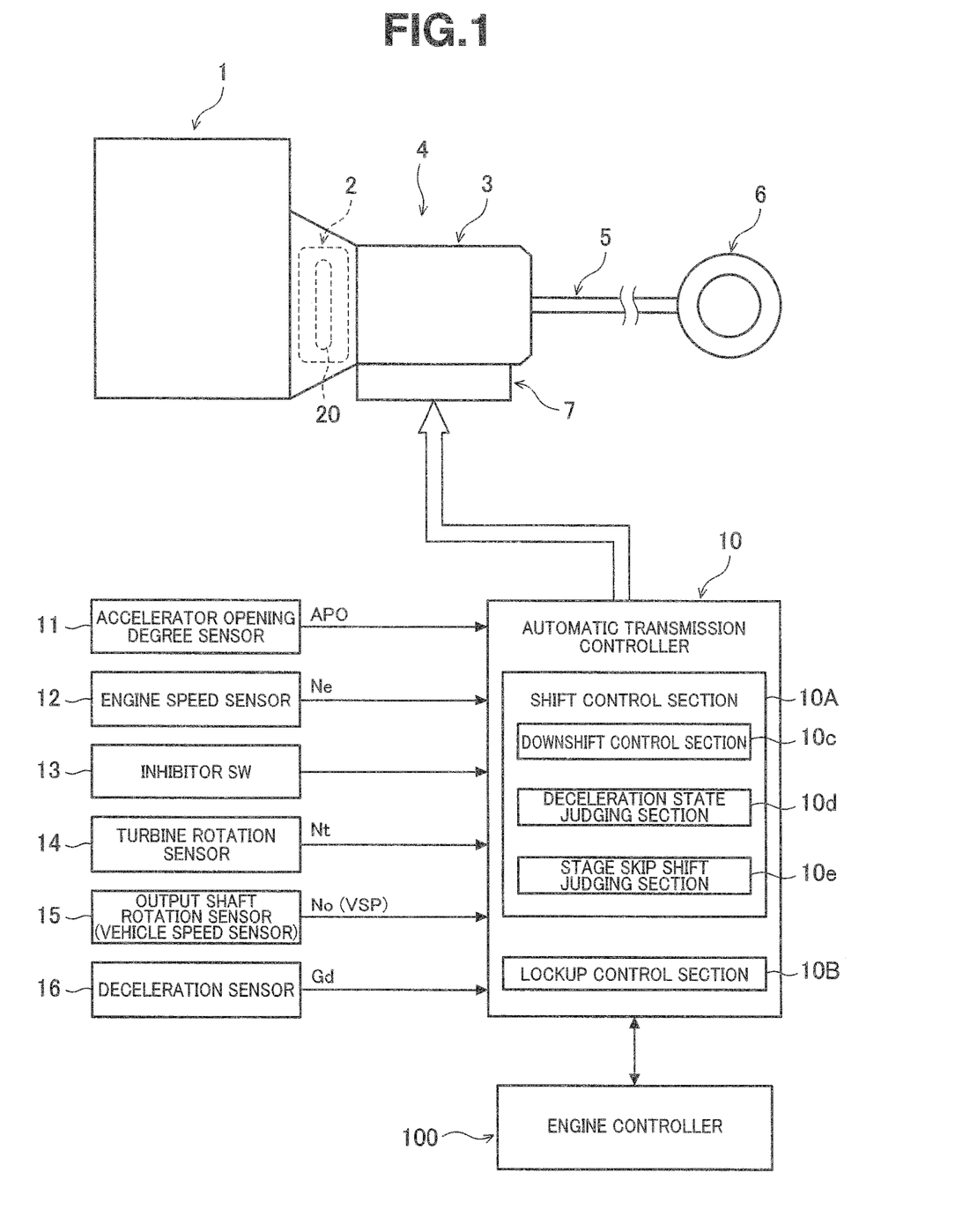
FIG. 1 is an overall system configuration view showing a power train including an automatic transmission for a vehicle and a control system thereof, in one embodiment according to the present invention.

As shown in FIG. 1, a power train of a vehicle according to the one embodiment includes an engine 1; an automatic transmission 4 including a torque converter 2 with a lockup clutch, and a stepwise automatic shift mechanism 3; and a power transmitting mechanism 5 disposed between an output shaft of the automatic transmission 4 and a driving wheel 6.

The stepwise automatic shift mechanism 3 is connected to the engine 1 through the torque converter 2 having the lockup clutch 20. The stepwise automatic shift mechanism 3 includes various frictional engagement elements (clutch or brake). The stepwise automatic shift mechanism 3 is arranged to attain shift stages (gear stages) by engaging or disengaging these frictional engagement elements. The engagements or the disengagements of these frictional engagement elements, and the engagement state of the lockup clutch 20 of the torque converter 2 are performed by switching the supply state of the oil by controlling solenoid valves provided in a hydraulic pressure circuit unit 7.

There is provided an automatic transmission controller (transmission control means) 10 configured to control the hydraulic pressure circuit unit 7. Moreover, there is provided an engine controller 100 configured to control the engine 1. The automatic transmission controller 10 is configured to control the hydraulic pressure circuit unit 7 based on information from various sensors 11 to 16. Besides, the automatic transmission controller 10 and the engine controller 100 are connected with each other to communicate the information, so as to control the automatic transmission 4 and the engine 1 in cooperation with each other.

[2. Configuration of Automatic Transmission]

Figure 2:
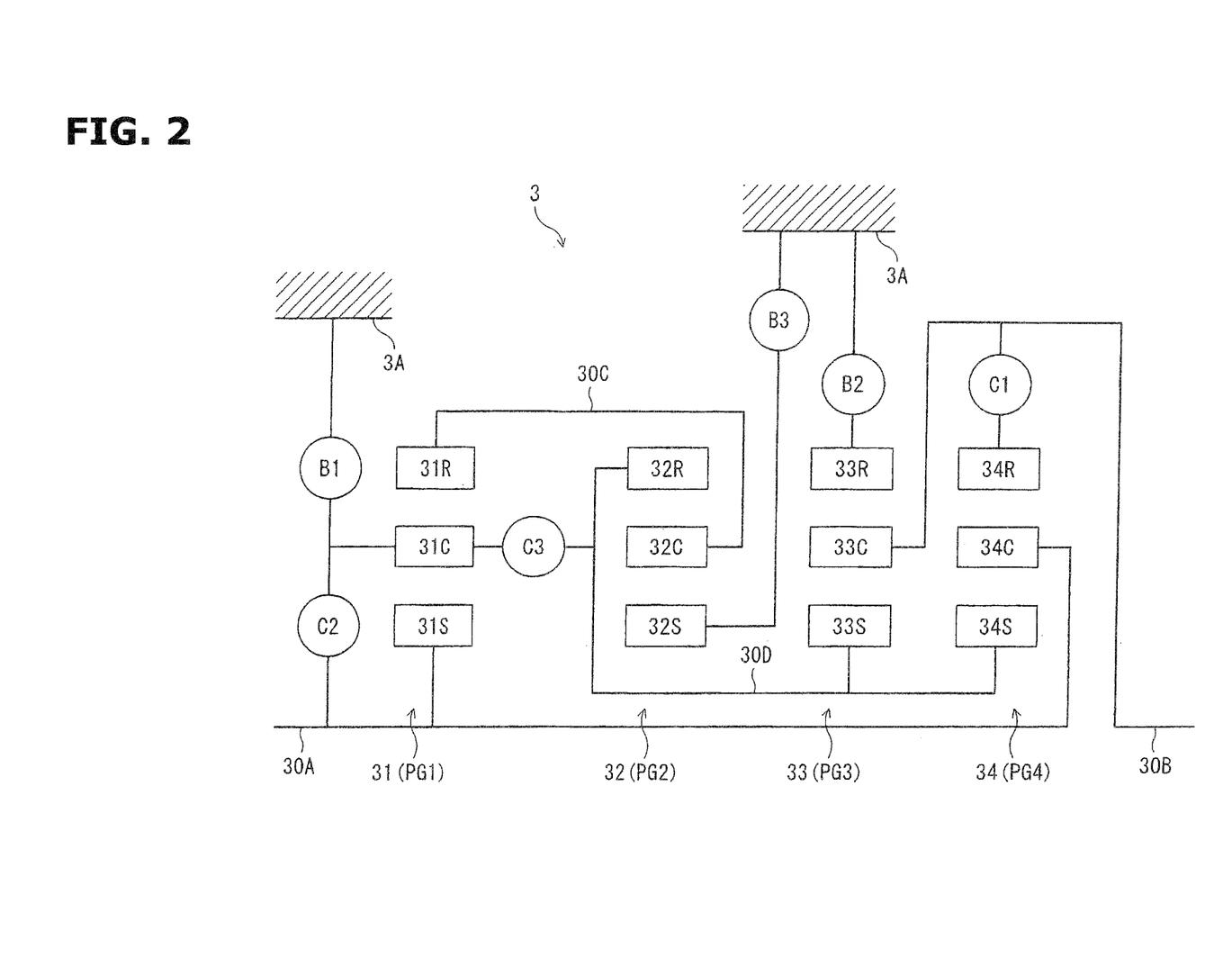
FIG. 2 is a skeleton diagram showing a configuration of a stepwise automatic transmission according to the one embodiment of the present invention.

As shown in FIG. 2, the automatic shift mechanism 3 includes four planetary gear mechanisms of a first planetary gear mechanism (PG1) 31, a second planetary gear mechanism (PG2) 32, a third planetary gear mechanism (PG3) 33, and a fourth planetary gear mechanism (PG4) 34 which are coaxially disposed in series with each other, so as to attain shift stages of forward nine speeds of first to ninth speed, and a backward speed. The planetary gear mechanisms 31 to 34 include, respectively, sun gears 31S to 34S, carriers 31C to 34C, and ring gears 31R to 34R.

The automatic shift mechanism 3 includes an input shaft 30A to which a rotation is inputted from the engine 1 through the torque converter 2; an output shaft 30B arranged to output the rotation through the power transmitting mechanism 5 to the driving wheel; and intermediate shafts 30C and 30D each connecting specific elements of the planetary gear mechanisms 31 to 34. Power transmitting paths are constituted by selective combination of predetermined elements of the planetary gear mechanisms 31 to 34, so that the corresponding shift stages are attained.

That is, the sun gear 31S of the first planetary gear mechanism 31, and the carrier 34C of the fourth planetary gear mechanism 34 are directly connected to the input shaft 30A of the automatic shift mechanism 3. Accordingly, the sun gear 31S of the first planetary gear mechanism 31, and the carrier 34C of the fourth planetary gear mechanism 34 are arranged to constantly rotate as a unit with the input shaft 30A. Moreover, the carrier 31C of the first planetary gear mechanism 31 is connected through a second clutch C2 to the input shaft 30A of the automatic shift mechanism 3.

The carrier 33C of the third planetary gear mechanism 33 is directly connected to the output shaft 30B of the automatic shift mechanism 3. Accordingly, the carrier 33C of the third planetary gear mechanism 33 is arranged to constantly rotate as a unit with the output shaft 30B. Moreover, the ring gear 34R of the fourth planetary gear mechanism 34 is connected through a first clutch C1 to the output shaft 30B of the automatic shift mechanism 3.

The ring gear 31R of the first planetary gear mechanism 31, the carrier 32C of the second planetary gear mechanism 32 are directly connected to the intermediate shaft 30C. Accordingly, the ring gear 31R of the first planetary gear mechanism 31, and the carrier 32C of the second planetary gear mechanism 32 are arranged to constantly rotate as a unit with each other.

The ring gear 32R of the second planetary gear mechanism 32, the sun gear 33S of the third planetary gear mechanism 33, and the sun gear 34S of the fourth planetary gear mechanism 34 are directly connected to the intermediate shaft 30D. Accordingly, the ring gear 32R of the second planetary gear mechanism 32, the sun gear 33S of the third planetary gear mechanism 33, and the sun gear 34S of the fourth planetary gear mechanism 34 are arranged to constantly rotate as a unit with each other.

The carrier 31C of the first planetary gear mechanism 31 is connected through a third clutch C3 to the intermediate shaft 30D. Moreover, the carrier 31C of the first planetary gear mechanism 31 is connected through a first brake B1 to a transmission case 3A. The sun gear 32 of the second planetary gear mechanism 32 is connected through a third brake B3 to the transmission case 3A. The ring gear 33R of the third planetary gear mechanism 33 is connected through a second brake B2 to the transmission case 3A.

The thus-constructed automatic shift mechanism 3 is arranged to attain one of the forward nine speeds of the first speed to the ninth speed, and the backward speed, by combination of the engagements of the frictional engagement elements of the first clutch C1, the second clutch C2, the third clutch C3, the first brake B1, the second brake B2, and the third brake B3.

Figure 3:
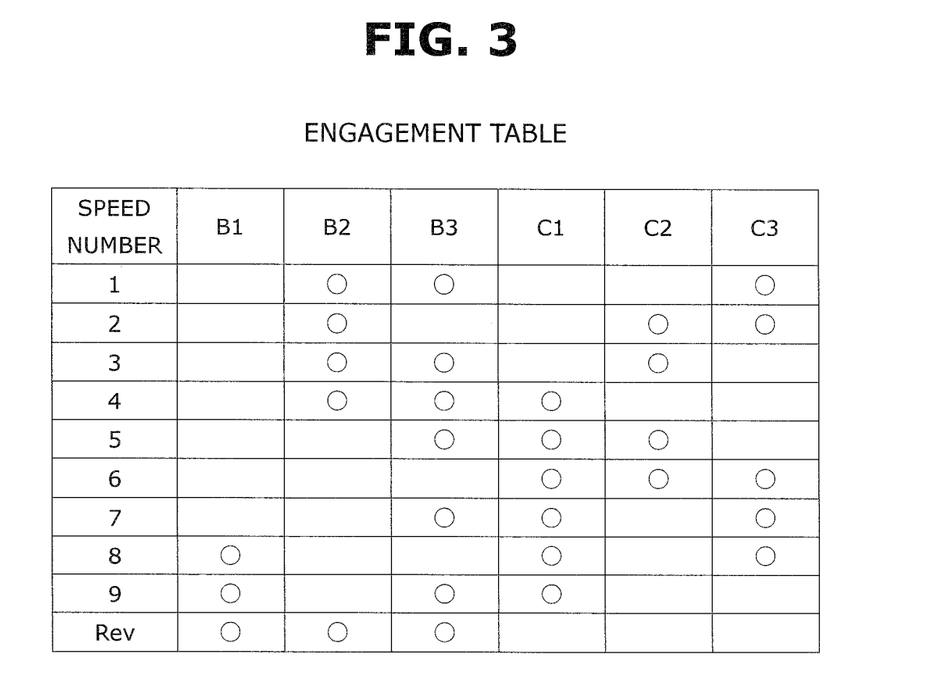
FIG. 3 is an engagement operation table of frictional engagement elements at each shift stage of the stepwise automatic transmission according to the one embodiment of the present invention.

FIG. 3 is an engagement operation table showing engagement states of the frictional engagement elements in the respective shift stages in the automatic shift mechanism 3. In FIG. 3, a symbol ○ represents the engagement state of the frictional engagement element. A blank represents the disengagement state of the frictional engagement element. Speed number 1 to 9 represents the forward first speed to ninth speed. A speed number Rev represents the backward speed. Besides, each shift stage is abbreviated as "nth speed" or merely "n speed".

As shown in FIG. 3, for attaining the first speed, the second brake B2, the third brake B3, and the third clutch C3 are engaged, and the other frictional engagement elements are disengaged. For attaining the second speed, the second brake B2, the second clutch C2, and the third clutch C3 are engaged, and the other frictional engagement elements are disengaged. For attaining the third speed, the second brake B2, the third brake B3, and the second clutch C2 are engaged, and the other frictional engagement elements are disengaged.

For attaining the fourth speed, the second brake B2, the third brake B3, and the first clutch C1 are engaged, and the other frictional engagement elements are disengaged. For attaining the fifth speed, the third brake B3, the first clutch C1, and the second clutch C2 are engaged, and the other frictional engagement elements are disengaged. For attaining the sixth speed, the first clutch C1, the second clutch C2, and the third clutch C3 are engaged, and the other frictional engagement elements are disengaged.

For attaining the seventh speed, the third brake B3, the first clutch C1, and the third clutch C3 are engaged, and the other frictional engagement elements are disengaged. For attaining the eighth speed, the first brake B1, the first clutch C1, and the third clutch C3 are engaged, and the other frictional engagement elements are disengaged. For attaining the ninth speed, the first brake B1, and the third brake B3, and the first clutch C1 are engaged, and the other frictional engagement elements are disengaged. For attaining the backward speed, the first brake B1, the second brake B2, and the third brake B3 are engaged, and the other frictional engagement elements are disengaged.

[3. Shift Control of Automatic Transmission]

Figure 4:
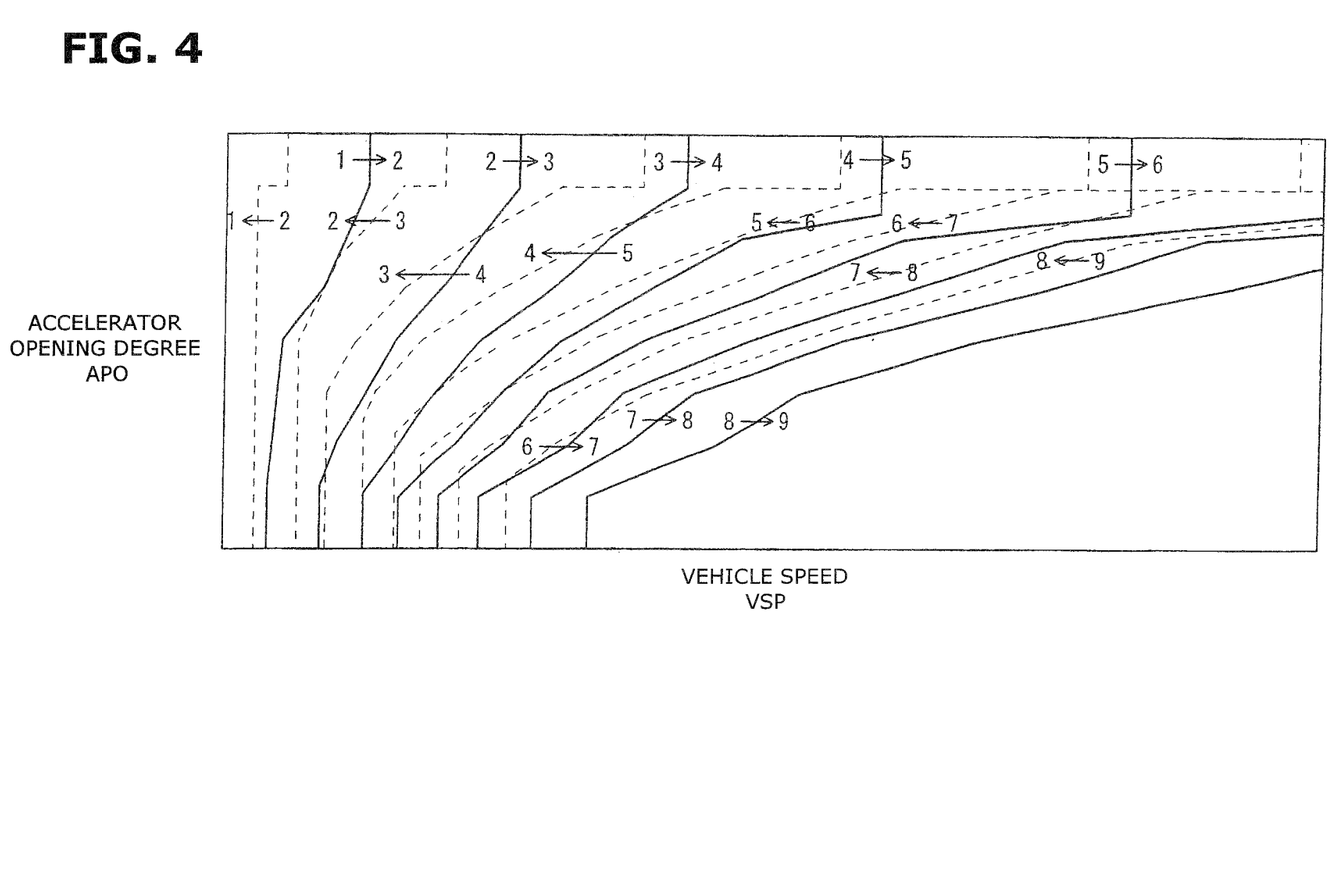
FIG. 4 is a shift line diagram of the automatic transmission according to the one embodiment of the present invention.

The automatic transmission controller 10 is configured to perform the shift control by the engagements and the disengagements of the frictional engagement elements of the automatic shift mechanism 3. FIG. 4 is a shift line diagram (shift map) which is used in the shift control at the selection of the D range, and in which shift lines are set. In FIG. 4, solid lines represent upshift lines. Broken lines show downshift lines. Besides, as shown in FIG. 1, the automatic transmission controller 10 is configured to receive information from an accelerator opening degree sensor 11, an engine speed sensor 12, an inhibitor switch 13, a turbine rotation speed sensor 14, an output shaft rotation speed (vehicle speed sensor, vehicle speed sensing means) 15, and a deceleration sensor (deceleration sensing means) 16. Besides, the deceleration sensor 16 is arranged to sense a deceleration Gd of the vehicle. However, the deceleration sensing means may be arranged to calculate the deceleration Gd of the vehicle, for example, from the vehicle speed.

The automatic transmission controller 10 includes a shift control section (shift control means) 10A and a lockup control section (lockup control means) 10B. The shift control section 10A is configured to judge a selection of the D range from a range selection information of the inhibitor switch 13. At the selection of the D range, the shift control section 10A is configured to retrieve (search), in the shift diagram, a position of a driving point determined based on a vehicle speed VSP obtained from a transmission output shaft rotation speed No from the output shaft rotation speed sensor 15, and a depression amount of an accelerator pedal (hereinafter, referred to as an accelerator opening degree APO) from the accelerator opening degree sensor 11. Then, the shift control section 10A is configured to maintain the shift stage at that time when the driving point is not moved, or when the driving point exists in the one shift stage region in the shift line diagram of FIG. 4 even in a case where the driving point is moved.

On the other hand, when the driving point is moved across the upshift line in the shift line diagram of FIG. 4, the shift control section 10A is configured to output an upshift command from the shift stage represented by the region in which the driving point exists before the movement across the upshift line, to the shift stage represented by the region in which the driving point exists after the movement across the upshift line. Moreover, when the driving point is moved across the downshift line in the shift line diagram of FIG. 4, the shift control section 10A is configured to output a downshift command from the shift stage represented by the region in which the driving point exists before the movement across the downshift line, to the shift stage represented by the region in which the driving point exists after the movement across the downshift line.

For example, in a case where the downshift command is output, when the shift stage of the region in which the driving point exists before the movement across the downshift line is nth speed, the shift stage is switched to (n−1)th speed of the region in which the driving point exists after the movement across the downshift line. Moreover, in a case where the upshift command is output, the shift stage is switched from (n−1)th speed to nth speed. In this case, n is natural number from 2 to 9.

Besides, at a coast traveling at which the vehicle travels in a release state of the accelerator pedal, the accelerator opening degree APO is 0. The driving point is varied only by the variation of the vehicle speed. The vehicle speed is determined by the input rotation speed of the automatic shift mechanism 3 (that is, the turbine rotation speed Nt of the torque converter 2) and the shift stage at that time. Accordingly, the movement of the driving point across the downshift line corresponds to a decrease of the turbine rotation speed Nt across a downshift rotation speed corresponding to the downshift line.

[Control at Coast Traveling]

The engine controller 100 is configured to control a fuel injection and an ignition of the engine 1 based on the detection information of the accelerator opening degree sensor 11, the engine speed sensor 12, a crank angle sensor (not shown) and so on. In the vehicle according to the example, the engine controller 10 is configured to perform a fuel cut to stop the fuel supply to the engine 1 when the accelerator opening degree is 0 (or smaller than a minute value), and when the engine speed Ne is equal to or greater than a fuel recovery rotation speed Nrec. In consideration of the prevention of the control hunting, it is preferable that the above-described latter condition is that the engine speed Ne is equal to or greater than a fuel cut rotation speed Ncut greater than the fuel recovery rotation speed Nrec.

That is, at the coast traveling at which the accelerator pedal is not depressed, when the engine speed Ne is equal to or greater than the fuel recovery rotation speed Nrec, the engine controller 100 performs the fuel cut. At this time, the automatic transmission controller 10 controls the torque converter 2 to the lockup state by the lockup control section 10B, in conjunction with the above-described fuel cut.

Besides, the torque converter 2 is brought to the lockup state by engaging the lockup clutch 20 disposed between the pump impeller side and the turbine runner side of the torque converter 2. In this case, the engagement of the lockup clutch 20 includes a full engagement (that is, engagement) in which the pump impeller side and the turbine runner side rotate as a unit with each other, and a slip engagement in which the pump impeller side and the turbine runner side are engaged to allow a slippage between the pump impeller side and the turbine runner side.

Moreover, when the engine speed Ne becomes smaller than the lockup release rotation speed Noff, the lockup clutch 20 is brought to the non-power transmitting state by the control of the automatic transmission controller 10, so as to release the lockup of the torque converter 2. This lockup release (non-power transmitting state of the lockup clutch 20) is that the lockup clutch 20 is slip engaged in a state where the torque transmitting substantially zero.

The fuel recovery rotation speed Nrec is set to be smaller than the lockup release rotation speed Noff. This reason is explained below. When the fuel supply to the engine 1 is restarted by the fuel recovery, the engine torque is suddenly increased. Accordingly, if the torque converter 2 is maintained in the lockup state, the sudden increased engine torque is transmitted through the torque converter 2 in the lockup state, and so on, directly to the driving wheels, so as to generate the large shock. Therefore, it is possible to avoid this problem by the above-described setting.

During the coast traveling, when the torque converter 2 is brought to the lockup state and the fuel cut is performed, the vehicle speed is decreased. The engine speed Ne and the turbine rotation speed Nt of the torque converter 2 are also decreased. Accordingly, firstly, the engine speed Ne becomes smaller than the lockup release rotation speed Noff. The automatic transmission controller 10 releases the lockup of the torque converter 10 (the slip engagement at substantially zero of the torque transmission amount).

Then, when the engine speed Ne becomes smaller than the fuel recovery rotation speed Nrec, the engine controller 100 finishes the fuel cut, and performs the fuel recovery to restart the fuel supply to the engine. In this way, at the restart of the fuel supply, the lockup of the torque converter 2 is released (the slip engagement at substantially zero of the torque transmission amount). Accordingly, it is possible to attain the smooth complete combustion (explosion) of the engine 1, and to start the engine 1.

On the other hand, at the coast traveling during the fuel cut, when the driving point is moved by the decrease of the vehicle speed across the downshift line in the shift line diagram of FIG. 4, the downshift (coast downshift) of the automatic shift mechanism 3 is performed by the control of the automatic transmission controller 10. By this downshift, the transmission gear ratio is increased, so that the engine speed Ne is increased. Accordingly, when the engine speed Ne is maintained to be equal to or greater than the lockup release rotation speed Noff and the fuel recovery rotation speed Nrec, it is possible to continue the lockup state of the torque converter 2, to continue the fuel cut, and to improve the fuel consumption.

The downshift line in the shift line diagram of FIG. 4 is set with respect to at least a predetermined low shift stage or more (in this case, the second speed or more) so that the engine speed Ne after the shift becomes equal to or greater than the lockup release rotation speed Noff in a case where the downshift is performed when the accelerator opening degree is zero or near zero. Accordingly, at the normal downshift, that is, at the downshift at which the deceleration Gd of the vehicle is relatively small, the engine speed Ne does not becomes smaller than the lockup release rotation speed Noff at the end of the shift, so that the lockup state is continued. Similarly, at the normal downshift, the engine speed Ne does not become smaller than the fuel recovery rotation speed Nrec. The fuel cut state is continued, so that the fuel recovery is not performed.

However, in a case where the deceleration Gd of the vehicle becomes large due to the sudden brake and so on, at the normal downshift according to the shift line of FIG. 4 as described above, the vehicle speed may become smaller than a next downshift line (next downshift judgment vehicle speed) at the end of the shift. It is not possible to maintain the engine speed Ne to be equal to or greater than the lockup release rotation speed Noff and the fuel recovery rotation speed Nrec. In this case, it is not possible to maintain the lockup and the fuel cut state.

Accordingly, the shift control section 10A includes a function element (downshift control section) 10c configured to control the downshift, and to perform a specific downshift control so as to maintain the lockup and the fuel cut state even when the deceleration Gd of the vehicle is large like the above-described state. This downshift by the downshift control section 10c includes one stage downshift to downshift the shift stage of the automatic shift mechanism 3 from the current shift stage to the next shift stage which is smaller than the current shift stage by the one shift stage, and a plural stage downshift (multiple stage downshift) to downshift the shift stage of the automatic shift mechanism 3 from the current shift stage to a target shift stage which is smaller than the current shift stage by two shift stages or more.

Besides, the plural stage downshift includes a continuous downshift to continuously downshift through intermediate shift stages to the target shift stage, and a stage skip downshift to downshift from the current shift stage directly to the target shift stage by skipping the intermediate shift stages.

Hereinafter, this downshift control is explained in detail.

The one stage downshift is a normal downshift. When the driving point is moved across one of the shift lines of FIG. 4 by the decrease of the vehicle speed Vsp, the shift stage is downshifted from nth speed to (n−1)th speed by the one shift stage. In this embodiment, an anticipated (look-ahead) vehicle speed Vpr is determined from the deceleration (deceleration degree) of the vehicle at the deceleration of the vehicle. The shift judgment by the downshift line of FIG. 4 is performed by using this anticipated vehicle speed Vpr as a shift judgment vehicle speed value. With this, it is possible to prevent the shift generated at a timing later than the timing defined by the shift line.

This anticipated vehicle speed Vpr is a vehicle speed after a predetermined time period Tdsi based on the sensed current vehicle speed VSp and the deceleration Gd. This anticipated vehicle speed Vpr is calculated by a following formula (1a).

$$Vpr = Vsp - Gd \cdot Tdsi \tag{1a}$$

The predetermined time period Tdsi corresponds to a time period after which the inertia phase is started after the start of the shift. This time periods Tdsi are slightly varied in accordance with the shift stage. The time periods Tdsi are previously understood (known) in accordance with the shift stages.

When it is judged that the driving point is moved across the downshift line of FIG. 4 based on this anticipated vehicle speed Vpr, that is, when the anticipated vehicle speed Vpr becomes equal to or lower than the downshift vehicle speed Vd so as to satisfy an inequality (1b), the downshift is started. Accordingly, the downshift is started when the sensed current vehicle speed Vsp satisfies the inequality (1c) from the equations (1a) and (1b).

$$Vpr \le Vd \tag{1b}$$

$$Vsp \le Vd + Gd \cdot Tdsi \tag{1c}$$

In this way, the downshift is started. With this, the inertia phase is started near a timing at which the actual vehicle speed Vsp (the driving point) is moved across the downshift line.

Besides, the anticipated vehicle speed Vpr is a value according to the deceleration Gd and the shift stage (nth speed) at that time. It is possible to calculate the anticipated vehicle speed Vpr by using a previously set and stored map. Moreover, in a below-described explanation, the anticipated vehicle speed Vpr at the downshift from nth speed to (n−1)th speed is represented by $Vpr_n$. The predetermined time period Tdsi at this time is represented by $Tdsi_n$.

Figure 5:
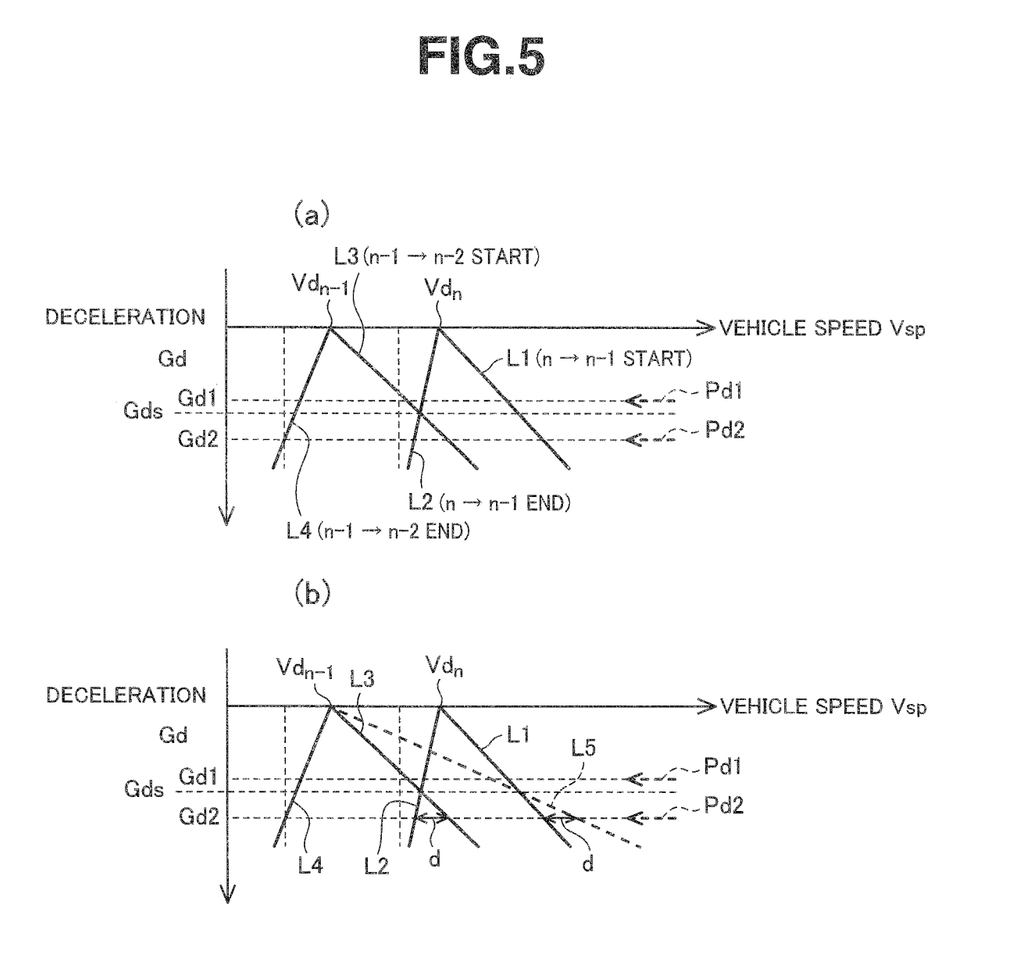
FIG. 5 are diagrams for explaining a downshift control by a control device of the automatic transmission according to the one embodiment of the present invention, in relationship with a vehicle speed and a deceleration of the vehicle.

FIGS. 5(a) and (b) are views showing the start and the end of the downshift by using this anticipated vehicle speed Vpr in a relationship between the vehicle speed Vsp and the deceleration Gd. In FIGS. 5(a) and (b), a horizontal axis represents the vehicle speed Vsp (higher speed toward the right direction). A vertical axis represents the deceleration Gd (larger deceleration toward the downward direction). Besides, large or small of the deceleration is represented in term of the absolute value of the deceleration, although the deceleration is a negative acceleration.

In FIGS. 5(a) and (b), a bold solid line L1 represents a downshift start line from the nth speed (the current shift stage) to the (n−1)th speed (the next shift stage). A bold solid line L2 represents a downshift end line from the nth speed (the current shift stage) to the (n−1)th speed (the next shift stage). A bold solid line L3 represents a downshift start line from the (n−1)th speed (the next shift stage) to the (n−2)th speed (the shift stage after next). A bold solid line L4 represents a downshift end line from the (n−1)th speed (the next shift stage) to the (n−2)th speed (the shift stage after next).

Besides, when the deceleration Gd is substantially zero, the downshift from the nth speed to the (n−1)th speed is performed at the vehicle speed $Vd_n$ corresponding to the downshift line from the nth speed to the (n−1)th speed. Moreover, the downshift from the (n−1)th speed to the (n−2)th speed is performed at the vehicle speed $Vd_{n-1}$ corresponding to the downshift line from the (n−1)th speed to the (n−2)th speed.

The time period Tdsi after which the inertia phase is started after the start of the shift, and the time period Tdi after which the shift is finished after the start of the inertia phase are slightly different in accordance with the shift stages. However, the downshift is judged by the anticipated vehicle speed Vpr at the higher vehicle speed Vsp as the deceleration Gd of the vehicle is greater. Accordingly, the bold solid lines L1 and L3 are inclined right downward so that the vehicle speed Vsp is higher as the deceleration Gd is greater. Furthermore, the time period from the start of the inertia phase to the end of the shift is slightly different in accordance with the shift stage. However, the vehicle speed Vsp at the end of the shift is lower as the deceleration Gd of the vehicle is greater. Accordingly, the bold solid lines L2 and L4 are inclined left downward so that the vehicle speed Vsp is lowered as the deceleration Gd is greater.

The bold solid line L1 is represented by a following equation (2a). The bold solid line L2 is represented by a following equation (2b). The bold solid line L3 is represented by a following equation (2c). The bold solid line L4 is represented by a following equation (2d). In the following equations (2a) and (2c), $Tdsi_n$ and $Tdsi_{n-1}$ are time periods after which the inertia phase is started after the start of the shift at the nth speed and the (n−1)th speed. In the following equations (2b) and (2d), $Tdie_n$ and $Tdie_{n-1}$ are time periods after which the shift is finished after the start of the inertia phase at the nth speed and the (n−1)th speed.

$$Vsp=Vd_n+Gd \cdot Tdsi_n \quad (2a)$$

$$Vsp=Vd_n-Gd \cdot Tdie_n \quad (2b)$$

$$Vsp=Vd_{n-1}+Gd \cdot Tdsi_{n-1} \quad (2c)$$

$$Vsp=Vd_{n-1}-Gd \cdot Tdie_{n-1} \quad (2d)$$

Bold broken arrows Pd1 and Pd2 shown in FIGS. 5(a) and (b) show time transitions of the traveling states (the vehicle speed and the deceleration) of the vehicle.

These traveling states of the vehicle are moved from right to left on a thin broken line, as shown by the bold broken arrow Pd1 or Pd2. In this case, it is supposed that the vehicle speed Vsp is lowered (moved in the leftward direction in FIG. 5) while maintaining the decelerations Gd1 and Gd2.

As shown in FIG. 5(a), when the driving state is moved (transited) along the arrow Pd1 to reach the solid line L1, the one stage downshift from the current shift stage (the nth speed) to the next shift stage (the (n−1)th speed) is commanded and started. The inertia phase is started near a timing at which the actual vehicle speed Vsp (the driving point) is moved across the vehicle speed of the shift line after the start of the one stage downshift. Moreover, when the driving state reaches the solid line L2, the one stage downshift from the current shift stage to the next shift stage is finished.

Then, when the driving state is transited along the arrow Pd1 to reach a solid line L3, the one stage downshift from the next shift stage (the (n−1)th speed) to the shift stage after next (the (n−2)th speed) is commanded. The inertia phase is started near a timing at which the vehicle speed Vsp is moved across the vehicle speed of the shift line after this one stage downshift. Moreover, when the driving stage reaches the solid line L4, the one stage downshift from the next shift stage to the shift stage after next is finished.

In this way, in a case where the driving state is transited along the arrow Pd1 at the relatively small deceleration Gd1, it is possible to maintain the engine speed Ne to be equal to or greater than the lockup release rotation speed $N_{LUre}$ while the shift state is downshifted one by one by the one shift stage in accordance with the decrease of the vehicle speed Vsp, and to maintain the fuel cut state.

On the other hand, in a case where the driving state is transited along the arrow Pd2 at the relatively large deceleration Gd2 as shown in FIG. 5A, when the driving state reaches the solid line L1, the one stage downshift from the current shift stage (the nth speed) to the next shift stage (the (n−1)th speed) is commanded and started. When the driving state reaches the solid line L2 after the start of the one stage downshift, the one stage downshift from the current shift stage to the next shift stage is finished. However, when the driving state reaches the solid line L3 before the end of the one stage downshift, the driving state reaches a timing at which the one stage downshift from the next shift stage (the (n−1)th speed) to the shift stage after next (the (n−2)th speed) is commanded.

That is, in a case where the vehicle speed (the downshift end vehicle speed, the vehicle speed on the solid line L2) Vde at which the one stage downshift from the current shift stage to the next shift stage is finished becomes lower than the vehicle speed Vsp (the vehicle speed on the solid line L3) at which the downshift from the next shift stage to the shift stage after next is started by using the anticipated vehicle speed Vpr, the downshift to the shift stage after next is delayed relative to the schedule determined by the shift line. In this case, it is necessary to start the downshift to the shift stage after next at the vehicle speed lower than the vehicle speed determined by the shift line. With this, the decrease of the engine speed Ne is caused due to the delay of the downshift, so that it is not possible to maintain the lockup and the fuel cut state.

In this case, the vehicle speed (the downshift end vehicle speed) Vsp on the solid line L2 at the end of the downshift from the nth speed to the (n−1)th speed is represented by $Vsp_n$. The vehicle speed (the downshift start vehicle speed) Vsp on the solid line L3 at the start of the downshift from the (n−1)th speed to the (n−2)th speed is represented by $Vsp_{n-1}$. The above-described situation is a situation in which a following inequality (3a) is satisfied. $Vsp_n$ and $Vsp_{n-1}$ are substituted for the above-described equations (2b) and (2c), so that following equations (3b) and (2c) are derived. A following inequality (3d) is derived from the equations (3a), (3b), and (2c).

$$Vsp_n \leq Vsp_{n-1} \quad (3a)$$

$$Vsp_n = Vd_n - Gd \cdot Tdie_n \quad (3b)$$

$$Vsp_{n-1} = Vd_{n-1} - Gd \cdot Tdsi_{n-1} \quad (3c)$$

$$Gd \geq Gds \quad (3d)$$

where $Gds = (Vd_n - Vd_{n-1})/(Tdie_n + Tdsi_{n-1})$

That is, in a case where the deceleration Gd becomes equal to or greater than a predetermined deceleration (deceleration threshold value) Gds, the downshift from the next shift stage to the shift stage after next is delayed.

Accordingly, the shift control section 10A includes a functional element (deceleration state judging section) 10d configured to compare the deceleration Gd and the threshold value Gds, and thereby to judge whether the vehicle is a gentle (slow) deceleration state or a sudden deceleration state. The deceleration state judging section 10d is configured to judge that the vehicle is in the gentle deceleration state when the deceleration Gd is smaller than the threshold value Gds, and to judge that the vehicle is in the sudden deceleration state when the deceleration Gd is equal to or greater than the threshold value Gds.

When the deceleration state judging section 10d judges the gentle deceleration state, the downshift control section 10c is configured to select and perform the one state downshift. When the deceleration state judging section 10d judges the sudden deceleration state, the downshift control section 10c is configured to select and perform the plural stage downshift. The plural downshift includes the continuous downshift and the stage skip downshift. When the plural stage downshift is selected, the downshift control section 10c is configured to select one of the continuous downshift and the stage skip downshift.

Besides, in the present invention, the target shift stage is a shift stage which is smaller than the current shift stage by at least two shift stages or more. However, in this embodiment, a simplest example in which the target shift stage is the shift stage (the shift stage after next) which is smaller than the current shift by the two shift stages is mainly explained. Besides, there is the shift stage which is smaller than the current shift stage by the two shift stages or more, for performing this plural stage downshift control.

In the stage skip downshift, the shift stage is directly downshifted from the current shift stage to the target shift stage by skipping the intermediate shift stage. Accordingly, even when the decrease of the engine speed Ne is rapid due to the sudden deceleration, it is possible to largely recover (retrieve) the engine speed Ne by the one shift. However, this stage skip downshift is effective for the rapid recovery of the engine speed Ne as long as this stage skip downshift can be performed by the single changeover.

The single changeover is a changeover by which the downshift is attained by disengaging one of the engaged frictional engagement elements, and engaging one of the disengaged frictional engagement elements, in the frictional engagement elements of the clutches C1 to C3 and the brakes B1 to B3. The transmission is configured to attain the shift between the adjacent shift stages by the single changeover. However, the transmission is often configured not to attain the shift between the shift stages which are not adjacent to each other like the stage skip downshift. When the downshift cannot by the single changeover, the shift needs the time. Accordingly, it is not possible to rapidly recover the engine speed Ne.

For example, as shown in the engagement table of FIG. 3, the stage skip downshift from the ninth speed to the seventh speed, the stage skip downshift from the seventh speed to the fifth speed, the stage skip downshift from the fifth speed to the third speed, and the stage skip downshift from the third speed to the first speed can be performed by the single changeover. However, the downshift from the sixth speed to the fourth speed, and the downshift from the forth speed to the second speed need to disengage the engagement states of two frictional engagement elements, and to engage the disengagement states of the two frictional engagement elements. These downshifts cannot be performed by the single changeover.

Accordingly, it is possible to judge whether or not the stage skip downshift can be performed by the single changeover, in accordance with the shift stage. Therefore, the shift control section 10A includes a functional element (stage skip judging section) 10e configured to judge whether or not the stage skip downshift can be performed by the single changeover, from the information of the shift stage at that time. The stage skip downshift judging section 10e is configured to constantly judge from the information of the shift stage at that time.

When the stage skip judging section 10e judges that the stage skip downshift can be performed by the single changeover, the downshift control section 10c is configured to select the stage skip downshift. When the stage skip judging section 10e judges that the stage skip downshift cannot be performed by the single changeover, the downshift control section 10c is configured to select the continuous downshift.

In case of the stage skip downshift from the current shift stage (the nth speed) to the shift stage after next (the (n−2)th speed), the downshift necessary time period Tdwn is previously understood (known) in each shift stage although the downshift necessary time periods Tdwn at the shift stages are different from each other. Moreover, the downshift necessary time period Tdwn of the stage skip downshift is not largely different from that of the one stage downshift from the current shift stage (the nth speed) to the next shift stage (the (n−1)th speed).

Accordingly, in this embodiment, the command of the stage skip downshift from the current shift stage to the shift stage after next is performed at the timing of the command of the one stage downshift from the current shift stage to the next shift stage.

On the other hand, in the continuous downshift, as described above, the first downshift from the current shift stage (the nth speed) to the next shift stage (the (n−1)th speed) is performed. Then, the second downshift from the next shift stage (the (n−1)th speed) to the shift stage after next (the (n−2)th speed) is performed. Accordingly, as shown in FIG. 5A, when the first downshift is finished, the vehicle speed becomes equal to or smaller than the shift line (the next downshift judgment vehicle speed) of the second downshift.

For preventing the delay of the downshift from the next shift stage to the shift stage after next, the downshift start vehicle speed from the current shift stage (the nth speed) to the next shift stage (the (n−1)th speed) is increased to be equal to or greater than the vehicle speed at the start of the downshift from the next shift stage (the (n−1)th speed) to the shift stage after next (the (n−2)th speed).

Accordingly, in the continuous downshift, the downshift is commanded at a vehicle speed higher than the vehicle speed in case of using the anticipated vehicle speed Vpr, by shifting the anticipated vehicle speed (the shift judgment vehicle speed value) Vpr to the high speed side (that is, advanced shift). That is, the downshift is performed by using an advanced vehicle speed Vprf.

This advanced vehicle speed Vprf is set in accordance with a vehicle speed difference d (=$Vsp_{n-1}-Vsp_n$) between the downshift end vehicle speed $Vsp_n$ at the first downshift from the nth speed to the (n−1)th speed, and the downshift start vehicle speed $Vde_{L3}$ at the second downshift from the (n−1)th speed to the (n−2)th speed. As shown in FIG. 5(b), this vehicle speed difference d is a difference between the solid line L2 and the solid line L3 at the same deceleration Gd. The vehicle speed difference d is linearly increased with respect to the deceleration Gd.

That is, the vehicle speed difference d is shown by a following equation (4a). A following equation (4b) is satisfied from the equation (4a), and the above-described equations (3b) and (3c).

$$d = Vsp_{n-1} - Vsp_n \qquad (4a)$$

$$\begin{aligned}d &= (Vd_{n-1} + Gd \cdot Tdsi_{n-1}) - \\ &\quad (Vd_n - Gd \cdot Tdie_n) \\ &= a \cdot Gd + b\end{aligned} \qquad (4b)$$

where $a = Tdsi_{n-1} + Tdie_n$,
$b = Vd_{n-1} - Vd_n$

Accordingly, the vehicle speed difference d is a value according to the deceleration Gd. Specifically, the vehicle speed difference d is linearly increased in accordance with the deceleration Gd. Consequently, the advanced vehicle speed Vprf can be set in accordance with the deceleration Gd.

Therefore, the downshift control section 10c is configured to set the advanced vehicle speed Vprf (=Vpr−d) [cf. a following equation (5)] which is corrected by subtracting the vehicle speed difference d (or the vehicle speed difference+ α) from the anticipated vehicle speed Vpr so that the downshift end vehicle speed $Vsp_n$ is shifted to the high speed side by the vehicle speed difference d (or by the vehicle speed difference d or more). The downshift control section 10c is configured to perform the downshift according to the shift line of FIG. 4 by using this advanced vehicle speed Vprf. That is, the downshift is started when the vehicle speed Vprf is decreased to be equal to or smaller than the downshift vehicle speed Vd.

$$Vprf = Vpr - d = Vsp - Gd \cdot Tdsi \qquad (5)$$

Besides, the vehicle speed difference d is a value according to the deceleration Gd at that time. The vehicle speed difference d can be calculated by using a map previously set and stored. Moreover, as described above, the anticipated vehicle speed Vpr is a value according to the deceleration Gd and the shift stage at that time. The vehicle speed difference d is a value according to the deceleration Gd at that time. Accordingly, the advanced vehicle speed Vprf is also a value according to the deceleration Gd and the shift stage at that time. Consequently, the advanced vehicle speed Vprf can be directly calculated by using the map previously set and stored.

[5. Operations and Effects]

The control device of the automatic transmission according to the one embodiment of the present invention is constituted as described above. Accordingly, it is possible to control the automatic transmission 3 during the coast traveling in the fuel cut state, as shown in a flowchart of FIG. 6 and so on.

Figure 6:
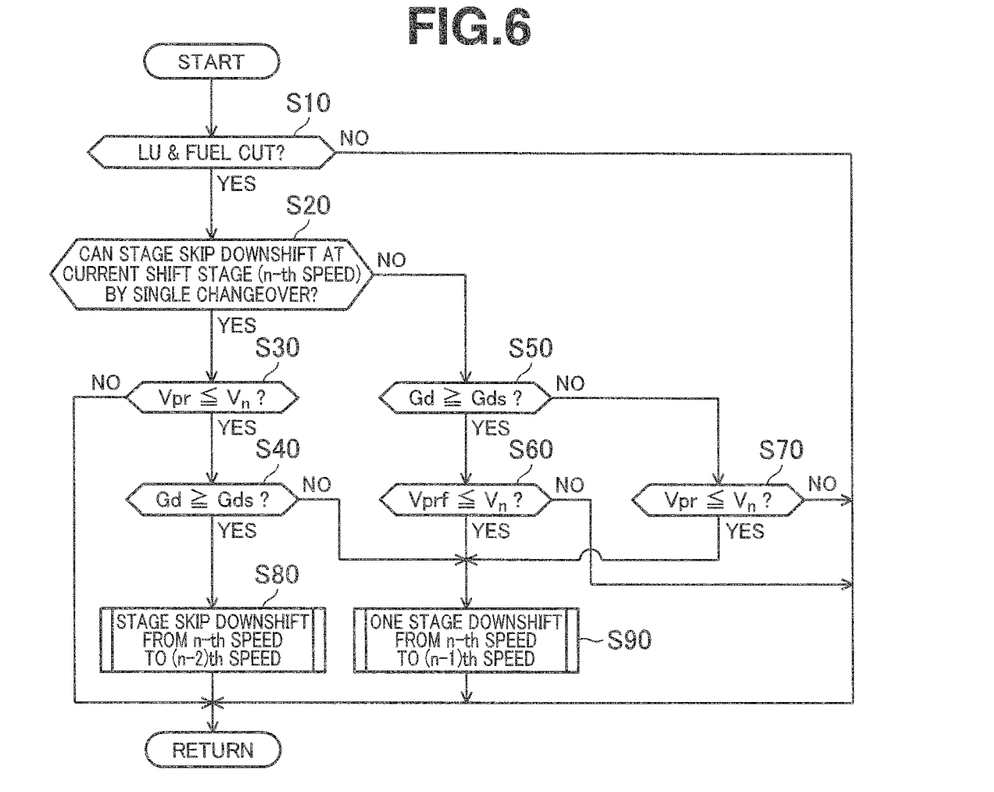
FIG. 6 is a flowchart for explaining a control method by the control device of the automatic transmission according to the one embodiment of the present invention.

As shown in FIG. 6, it is judged whether or not the torque converter 2 is in the lockup (LU) state and the fuel cut is performed during the coast traveling of the vehicle (step S10). When the vehicle is not in the LU state and during the fuel cut, the specific control during the coast traveling is not performed. When the vehicle is in the LU state and during the fuel cut, it is judged whether or not the stage skip downshift can be performed by the single changeover at the current shift stage (the nth speed) (step S20).

When the stage skip downshift by the single changeover can be performed, it is judged whether or not the anticipated vehicle speed Vpr becomes equal to or smaller than the downshift vehicle speed $V_n$ for the downshift from the nth speed to the (n−1)th speed (step S30). When the anticipated vehicle speed Vpr does not become equal to or smaller than the downshift vehicle speed $V_n$, the process is returned. When it is judged that the anticipated vehicle speed Vpr becomes equal to or smaller than the downshift vehicle speed $V_n$, it is judged whether or not the deceleration Gd is equal to or greater than the threshold value Gds (step S40).

When it is judged that the deceleration Gd is equal to or greater than the threshold value Gds, the stage skip downshift from the nth speed to the (n−2)th speed is performed (step S80) since the shift delay is generated by the one stage downshift. With this, it is possible to suppress the generation of the delay of the shift. Moreover, when it is judged that the deceleration Gd is not equal to or greater than the threshold value Gds, the one stage downshift from the nth speed to the (n−1)th speed is performed (step S90) since the shift delay is not generated even by the one stage downshift.

On the other hand, when it is judged that the stage skip downshift by the single changeover cannot be performed at step S20, it is judged whether or not the deceleration Gd is equal to or greater than the threshold value Gds (step S50). When it is judged that the deceleration Gd is equal to or greater than the threshold value Gds, the advanced vehicle speed Vprf is used since the shift delay is generated by the normal one stage downshift. It is judged whether or not the advanced vehicle speed Vprf becomes equal to or smaller than the downshift vehicle speed $V_n$ for the downshift from the nth speed to the (n−1)th speed (step S60).

When the advanced vehicle speed Vprf does not become equal to or smaller than the downshift vehicle speed $V_n$, the process is returned. When the advanced vehicle speed Vprf becomes equal to or smaller than the downshift vehicle speed $V_n$, the one stage downshift from the nth speed to the (n−1)th speed is performed (step S90). By the advanced vehicle speed Vprf, the downshift is started from a state in which the actual vehicle speed Vsp is high. Accordingly, it is possible to suppress the generation of the shift delay.

On the other hand, it is judged that the deceleration Gd is not equal to or greater than the threshold value Gds at step S50, the anticipated vehicle speed Vpr is used since the shift delay is not generated even by the normal one stage downshift using the anticipated vehicle speed Vpr. It is judged whether or not the anticipated vehicle speed Vpr becomes equal to or smaller than the downshift vehicle speed $V_n$ (step S70). When the anticipated vehicle speed Vpr does not become equal to or smaller than the downshift vehicle speed $V_n$, the process is returned. When it is judged that the anticipated vehicle speed Vpr becomes equal to or smaller than the downshift vehicle speed $V_n$, the one stage downshift from the nth speed to the (n−1)th speed is performed (step S90).

In this way, even at the sudden deceleration at which the amount of the deceleration Gd of the vehicle is large, it is possible to avoid the shift delay by using the plural stage downshift. Moreover, it is possible to extend (prolong) the fuel cut period by continuing the state where the engine speed Ne is higher than the lockup release rotation speed $N_{LUre}$ during the longer time period. Accordingly, it is possible to attain the fuel economy improvement effect.

Next, an example in which the downshift is performed in accordance with the variations of the vehicle speed Vsp and the deceleration Gd of the vehicle is explained with reference to FIG. 7 and FIG. 8. Besides, in FIG. 7 and FIG. 8, similarly to FIG. 5, a horizontal axis is the vehicle speed Vsp (higher speed toward a rightward direction), and a vertical axis is the deceleration G (the deceleration is increased toward a downward direction).

Figure 7:
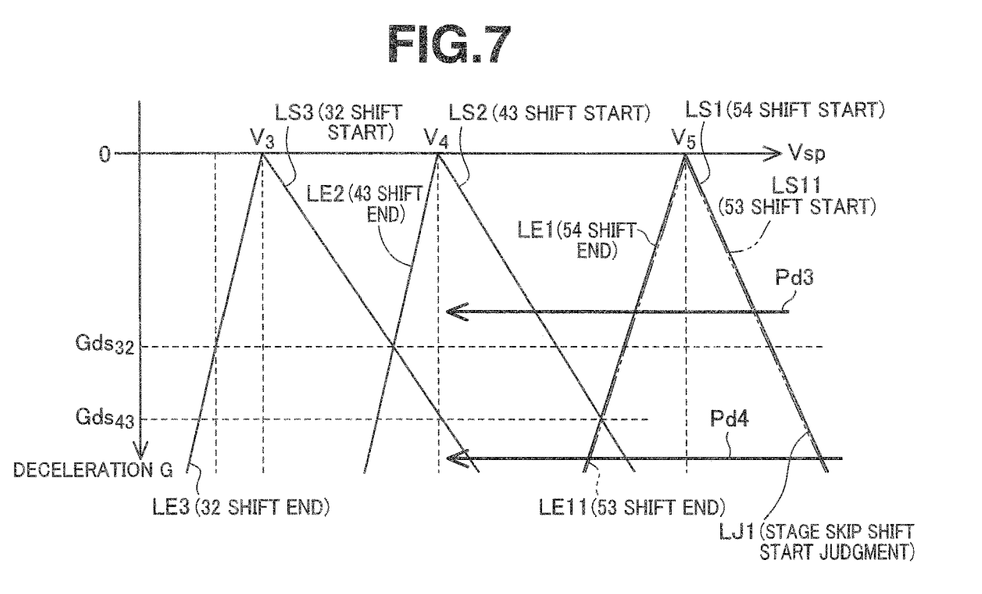
FIG. 7 is a view for explaining an example of a stage skip downshift of the downshift control by the control device of the automatic transmission according to the one embodiment of the present invention, in relationship with the vehicle speed and the deceleration of the vehicle.
Figure 8:
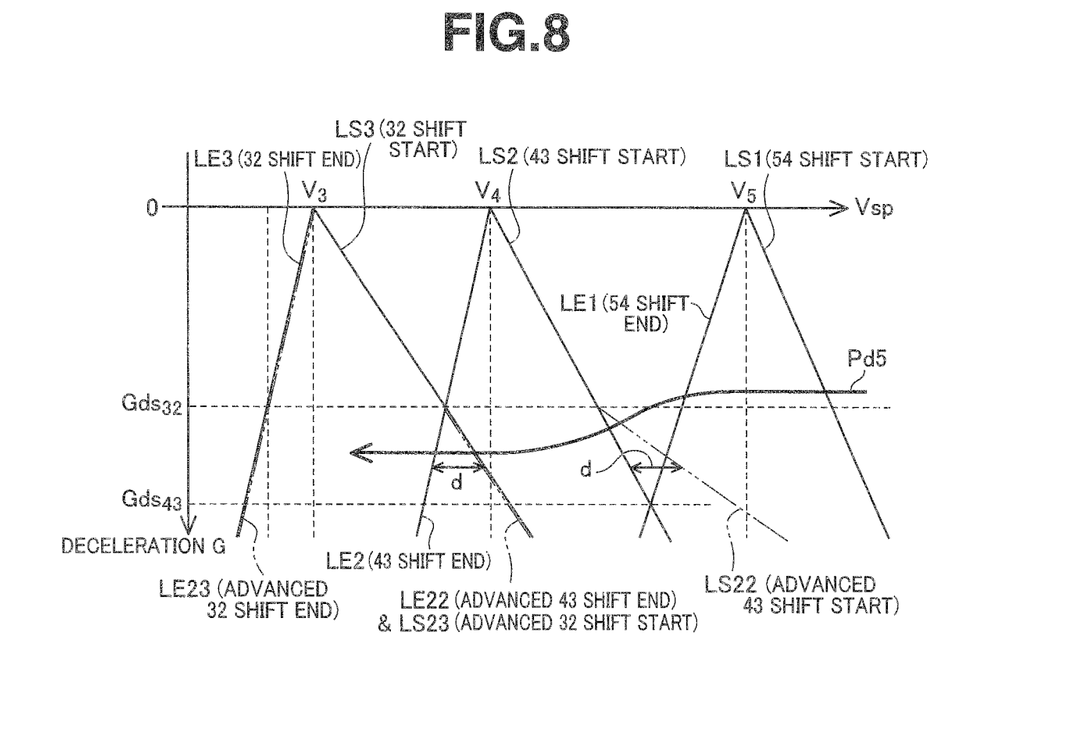
FIG. 8 is a view for explaining an example of the continuous downshift of the downshift control by the control device of the automatic transmission according to the one embodiment of the present invention, in relationship with the vehicle speed and the deceleration of the vehicle.

Lines LS1 to LS3, LS11, LS22, and LS23 to which "shift start" are added in FIG. 7 and FIG. 8 represent states (the vehicle speed Vsp and the deceleration Gd) of the vehicle when the downshift is started in case of performing the downshift. The lines LS1 to LS3 represent the start of the one stage downshift in case of using the anticipated vehicle speed Vpr. The line LS11 represents the start of the stage skip downshift. The lines LS22 and LS23 represent the end of the one stage downshift in case of using the advanced vehicle speed Vprf.

Lines LE1 to LE3, LE11, LE22, and LS23 to which "shift end" are added in FIG. 7 and FIG. 8 represent states (the vehicle speed Vsp and the deceleration Gd) of the vehicle when the downshift is finished in case of performing the downshift. The lines LE1 to LE3 represent the end of the one stage downshift in case of using the anticipated vehicle speed Vpr. The line LS11 represents the end of the stage skip downshift. The lines LS22 and LS23 represent the end of the one stage downshift in case of using the advanced vehicle speed Vprf.

Moreover, "54", "43", and "32" which are added on front sides of the "shift start" or the "shift end" in FIG. 7 and FIG. 8 represent, respectively, the downshift from the fifth speed to the fourth speed, the downshift from the fourth speed to the third speed, and the downshift from the third speed to the second speed. Furthermore, "53" which is added on front sides of the "shift start" or the "shift end" in FIG. 7 and FIG. 8 represent the stage step downshift from the fifth speed to the third speed. Moreover, "advanced 43" and "advanced 32" which are added on front sides of the "shift start" represent, respectively, the starts of 43 downshift and 32 downshift of the continuous downshift. Furthermore, "advanced 43" and "advanced 32" which are added on front sides of the "shift end" represent, respectively, the ends of 43 downshift and 32 downshift of the continuous downshift.

Moreover, arrows Pd3 to Pd5 represent, respectively, time transitions of the states of the vehicle. Furthermore, in FIG. 7 and FIG. 8, $Gds_{43}$ and $Gds_{32}$ are threshold values Gds of the deceleration Gd. $Gds_{43}$ represents the threshold value at the downshift from the fourth speed to the third speed. $Gds_{32}$ represents the threshold value at the downshift from the third speed to the second speed.

As shown in FIG. 7, when the state of the vehicle is transited along the arrow Pd3, the deceleration Gd (the absolute value) is maintained to be smaller than the threshold values $Gds_{43}$ and $Gds_{32}$. Accordingly, the plural stages downshift such as the stage skip downshift and the continuous downshift is not needed. By the one stage downshift, the downshift from the fifth speed to the fourth speed, the downshift from the fourth speed to the third speed, and the downshift from the third speed to the second speed are performed in order. It is possible to extend (prolong) the fuel cut period by continuing the state where the engine speed Ne is higher than the lockup release rotation speed $N_{LUre}$ during the longer time period, and to attain the fuel economy improvement effects.

On the other hand, as shown in FIG. 7, when the state of the vehicle is transited along the arrow Pd4, the sudden deceleration state in which the deceleration Gd (the absolute value) is higher than the threshold values $Gds_{43}$ and $Gds_{32}$ is maintained. Accordingly, the plural stage downshift such as the stage skip downshift and the continuous downshift is needed. In case of the fifth speed, it is possible to select the stage skip downshift. Accordingly, the stage skip downshift from the fifth speed to the third speed is started at the timing of the start of the one stage downshift in case of using the anticipated vehicle speed Vpr, that is, at a timing at which the anticipated vehicle speed Vpr is moved across the downshift line from the fifth speed to the fourth speed (at a timing at which the sensed vehicle speed Vsp is moved across the line LS11 from the right to the left). Then, the stage skip downshift is finished (at a timing at which the sensed vehicle speed Vsp is moved across the line LE11 from the right to the left). With this, it is possible to perform the 32 downshift after the 53 stage skip downshift, without the delay. It is possible to extend (prolong) the fuel cut time period by continuing the state where the engine speed Ne is higher than the lockup release rotation speed $N_{LUre}$ during the longer time period, by using the second speed or more. Accordingly, it is possible to attain the fuel economy improvement effects.

Moreover, when the state of the vehicle is transited along the arrow Pd5 shown in FIG. 8, at first, the vehicle is in the gentle deceleration in which the deceleration Gd (the absolute value) is lower than the threshold value $Gds_{43}$ and $Gds_{32}$. Accordingly, the plural stage downshift such as the stage skip downshift and the continuous downshift is not needed. By the one stage downshift, the downshift from the fifth speed to the fourth speed is performed, so that the engine speed Ne is maintained to be higher than the lockup release rotation speed $N_{LUre}$.

However, in the middle (in this case, after the end of the downshift to the fourth speed side), the vehicle is varied to the sudden deceleration state in which the deceleration Gd (the absolute value) is higher than the threshold value $Gds_{32}$. Accordingly, the plural stage downshift such as the stage skip downshift and the continuous downshift is needed. In case of the fourth speed, it is not possible to select the stage skip downshift. Consequently, the continuous downshift is performed by using the advanced vehicle speed Vprf. In case of using the advanced vehicle speed Vprf, the one stage downshift to the next shift stage (in this case, the third speed) is started at a timing at which the vehicle speed Vsp is higher than that in case of using the anticipated vehicle speed Vpr.

In this continuous downshift, the one stage downshift from the fourth speed to the third speed, and the one stage downshift from the third speed to the second speed are continuously performed. However, the timing of the start (the command) of the shift of the one stage downshift from the fourth speed to the third speed is advanced by using the advanced vehicle speed Vprf. Accordingly, it is possible to perform the downshift from the third speed to the second speed without the delay, after the downshift from the fourth speed to the third speed. It is possible to extend (prolong) the fuel cut period by continuing the state where the engine speed Ne is higher than the lockup release rotation speed $N_{LUre}$ during the longer time period, by the second speed or more. Accordingly, it is possible to attain the fuel economy improvement effects.

Besides, in this embodiment, as the simplest example, the advanced vehicle speed Vprf is the value obtained by correcting the anticipated vehicle speed Vpr to the low speed side by the vehicle speed difference d according to the deceleration degree Gd and the shift stage at that time. However, the advanced vehicle speed Vprf may be a value obtained by correcting the anticipated vehicle speed Vpr by the vehicle speed difference d+α by adding a margin α to the vehicle speed difference in consideration of the variation of the deceleration Gd.

Moreover, when it is judged that the continuous downshift is performed, the first stage downshift of the continuous downshift may be started at the timing of this judgment, as a simplest and surest method.

[Others]

Hereinabove, the embodiments according to the present invention are explained. However, the present invention is not limited to these embodiments.

In the embodiments, the plural stage downshift control by which the shift stage is shifted to the target shift stage that is lower than the current shift stage by the two stage or more includes the stage skip downshift. However, the plural stage downshift control may be performed by using only the continuous downshift.

Moreover, it is preferable that the downshift control section 10c stops the continuous downshift when the deceleration is not the sudden deceleration state, at the timing of the end of the downshift to the next shift stage in the continuous downshift.

Furthermore, the above-described embodiments exemplify the stepwise automatic shift mechanism having the shift stages of the nine forward speeds. However, the shift stages of the stepwise automatic shift mechanism is not limited to this.

Besides, it is possible to largely attain the effects of the present invention as the speed numbers of the forward shift stages are more.

The invention claimed is:

1. A control device for an automatic transmission of a vehicle arranged
    to bring a torque converter to a lockup state and to perform a fuel cut by which a fuel supply to an engine is stopped during a coast traveling in which an accelerator pedal is released,
    to release the lockup of the torque converter when an engine speed is decreased to a lockup release rotation speed during the fuel cut, and
    to perform a fuel recovery to finish the fuel cut to restart of the fuel supply to the engine when the engine speed is decreased to be a fuel recovery rotation speed lower than the lockup release rotation speed,
    the automatic transmission including the torque converter, and a stepwise automatic shift mechanism to which a rotation from the engine is input through the torque converter, and which is arranged to attain a plurality of shift stages by combinations of engagements and disengagements of a plurality of frictional engagement elements,
    the control device comprising:
    a controller including;
    a shift control section configured to perform a downshift control of the automatic shift mechanism by a changeover of the frictional engagement elements when a vehicle speed is decreased to be equal to or smaller than a predetermined downshift vehicle speed during the fuel cut,
    the shift control section including;
        a deceleration state judging section configured to judge whether a deceleration of the vehicle is a gentle deceleration state or a sudden deceleration state, and
        a downshift control section configured
            to command a plural stage downshift to downshift from a current shift stage of the automatic shift mechanism to a target shift stage that is lower than the current shift stage by two stages or more when the deceleration state judging section judges the sudden deceleration state,
        wherein the plural stage downshift includes a continuous downshift to continuously downshift through an intermediate shift stage toward the target shift stage, and
        wherein the shift control section is configured to judge the shift based on a shift judgement vehicle speed value according to the detected vehicle speed by using a shift map in which shift lines are set, and to judge the shift by shifting the shift judgment vehicle speed to a lower speed side when the continuous downshift is performed.

2. The control device for the automatic transmission as claimed in claim 1, wherein the control device includes a deceleration sensing section configured to sense the deceleration of the vehicle; deceleration threshold values are set at the respective shift stages of the automatic shift mechanism; and the deceleration state judging section is configured to compare the sensed deceleration with the deceleration threshold values, and thereby to judge whether the deceleration is the gentle deceleration state or the sudden deceleration state.

3. The control device for the automatic transmission as claimed in claim 1, wherein the plural stage downshift includes a stage skip downshift to downshift toward the target shift stage by skipping the intermediate shift stage;
    the shift control section includes a stage skip judging section configured to judge from the current shift stage whether or not the stage skip downshift can be performed by a single changeover by the disengagement of one of the plurality of the frictional engagement elements, and the engagement of another of the plurality of the frictional engagement elements; and
    when the plural stage downshift is performed, the downshift control section configured
        to perform the stage skip downshift when the stage skip judging section judges that the stage skip downshift can be performed, and
        to perform the continuous downshift when the stage skip judging section judges that the stage skip downshift cannot be performed.

4. The control device for the automatic transmission as claimed in claim 3, wherein the downshift control section is configured to command one stage downshift to downshift from a current shift stage of the automatic shift mechanism to a next shift stage that is lower than the current shift stage by one stage when the deceleration state judging section judges the gentle deceleration state; and the shift control section is configured to judge the shift based on a shift judgment vehicle speed value according to the detected vehicle speed by using a shift map in which shift lines are set, and to judge the shift by using the shift lines for performing the one stage downshift from the current shift stage, when the stage skip downshift is performed.

5. The control device for the automatic transmission as claimed in claim 1, wherein the downshift control section is configured to stop the continuous downshift when the deceleration is not the sudden deceleration state at a timing of an end of the downshift to the next shift stage in the continuous downshift.

6. A control method for an automatic transmission of a vehicle arranged
  to bring a torque converter to a lockup state and to perform a fuel cut by which a fuel supply to an engine is stopped during a coast traveling in which an accelerator pedal is released,
  to release the lockup of the torque converter when an engine speed is decreased to a lockup release rotation speed during the fuel cut, and
  to perform a fuel recovery to finish the fuel cut to restart of the fuel supply to the engine when the engine speed is decreased to be a fuel recovery rotation speed lower than the lockup release rotation speed,
  the automatic transmission including the torque converter, and a stepwise automatic shift mechanism to which a rotation from the engine is input through the torque converter, and which is arranged to attain a plurality of shift stages by combinations of engagements and disengagements of a plurality of frictional engagement elements,
  the control method comprising:
  performing a downshift control of the automatic shift mechanism by a changeover of the frictional engagement elements when a vehicle speed is decreased to be equal to or smaller than a predetermined downshift vehicle speed during the fuel cut;
  a deceleration state judging section judging step of judging whether a deceleration of the vehicle is a gentle deceleration state or a sudden deceleration state; and
  a downshift controlling step of commanding a plural stage downshift to downshift from the current shift stage of the automatic shift mechanism to a target shift stage that is lower than the current shift stage by two stages or more when the deceleration state judging step judges the sudden deceleration state,
  wherein the plural stage downshift includes a continuous downshift to continuously downshift through an intermediate shift stage toward the target shift stage, and
  wherein the downshift control is configured to judge the shift based on a shift judgement vehicle speed value according to the detected vehicle speed by using a shift map in which shift lines are set, and to judge the shift by shifting the shift judgment vehicle speed to a lower speed side when the continuous downshift is performed.

* * * * *